United States Patent
Jang et al.

(10) Patent No.: US 8,075,440 B2
(45) Date of Patent: Dec. 13, 2011

(54) POWER TRAIN OF AUTOMATIC TRANSMISSION

(75) Inventors: Wookjin Jang, Yongin (KR); Ho Rim Yang, Suwon (KR)

(73) Assignee: Hyundai Motor Company, Seoul (KR)

( * ) Notice: Subject to any disclaimer, the term of this patent is extended or adjusted under 35 U.S.C. 154(b) by 448 days.

(21) Appl. No.: 12/437,330

(22) Filed: May 7, 2009

(65) Prior Publication Data

US 2009/0291800 A1    Nov. 26, 2009

(30) Foreign Application Priority Data

May 23, 2008  (KR) .................. 10-2008-0048215

(51) Int. Cl.
*F16H 3/62*    (2006.01)

(52) U.S. Cl. .................. 475/271; 475/279; 475/282

(58) Field of Classification Search .................. 475/271, 475/279, 282
See application file for complete search history.

(56) References Cited

U.S. PATENT DOCUMENTS

| 6,758,785 B2 * | 7/2004 | Raghavan et al. | ............ 475/276 |
| 2006/0019794 A1 * | 1/2006 | Raghavan et al. | ............ 475/282 |

FOREIGN PATENT DOCUMENTS

JP        2003-130152 A        5/2003

* cited by examiner

*Primary Examiner* — Sherry Estremsky
(74) *Attorney, Agent, or Firm* — Morgan, Lewis & Bockius LLP

(57) ABSTRACT

The present invention relates to a power train of an automatic transmission that realizes eight forward speeds and one reverse speed by using two double pinion planetary gear sets, one single pinion planetary gear set, four clutches, and two brakes wherein the friction members are selectively connected to the operating members of the pinion planetary gear sets to the input shaft, other operating members, or the transmission case.

8 Claims, 3 Drawing Sheets

FIG. 2

| shift speed | C1 | C2 | C3 | C4 | B1 | B2 | SPEED RATIO |
|---|---|---|---|---|---|---|---|
| D1 | | | ● | | | ● | 4.833 |
| D2 | | | ● | | ● | | 3.043 |
| D3 | | | ● | ● | | | 1.667 |
| D4 | ● | | ● | | | | 1.280 |
| D5 | | ● | ● | | | | 1.000 |
| D6 | ● | ● | | | | | 0.729 |
| D7 | | ● | | ● | | | 0.595 |
| D8 | | ● | | | ● | | 0.467 |
| REV | | | | ● | | ● | −2.167 |

POWER TRAIN OF AUTOMATIC TRANSMISSION

CROSS-REFERENCE TO RELATED APPLICATION

The present application claims priority to Korean Patent Application Number 10-2008-0048215 filed on May 23, 2008, the entire contents of which are incorporated herein for all purposes by this reference.

BACKGROUND OF THE INVENTION

1. Field of the Invention

The present invention relates to a power train of an automatic transmission. More particularly, the present invention relates to a power train of an automatic transmission that realizes eight forward speeds and one reverse speed by using two double pinion planetary gear sets, one single pinion planetary gear set, four clutches, and two brakes.

2. Description of Related Art

A typical shift mechanism of an automatic transmission utilizes a combination of a plurality of planetary gear sets. A power train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a power train, such as durability, efficiency in power transmission, and size, substantially depend on the layout of the combined planetary gear sets. Therefore, designs for a combining structure of a power train are also under continuous investigation.

A manual transmission that has too many speeds causes inconvenience to a driver. Therefore, the advantageous features of having more shift-speeds are more important in an automatic transmission because an automatic transmission automatically controls the shifting operations.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a power train of an automatic transmission having advantages of realizing eight forward speeds and one reverse speed by using two double pinion planetary gear sets, one single pinion planetary gear set, four clutches, and two brakes.

In an aspect of the present invention, the power train of an automatic transmission may include a first planetary gear set including a first operating member connected to a transmission case, a second operating member, and a third operating member connected to an input shaft, wherein the second operating member outputs a reduced rotation speed, a second planetary gear set including a fourth operating member connected to the second operating member, a fifth operating member selectively connected to the input shaft, and a sixth operating member, a third planetary gear set including a seventh operating member selectively connected to the third or fourth operating members and selectively connected to the transmission case, an eighth operating member connected to the sixth operating member and selectively connected to the transmission case, and a ninth operating member selectively connected to the fifth operating member and connected to an output shaft, and a plurality of friction members selectively connecting the operating members of the first, second, and third planetary gear sets to the input shaft, other operating members, or the transmission case.

The plurality of friction members may include a first clutch selectively connecting the third operating member to the seventh operating member, a second clutch selectively connecting the fifth operating member to the input shaft, a third clutch selectively connecting the fifth operating member to the ninth operating member, a fourth clutch selectively connecting the fourth operating member to the seventh operating member, a first brake selectively connecting the seventh operating member to the transmission case, and a second brake selectively connecting the eighth operating member to the transmission case, wherein the third clutch and the second brake are operated at a first forward speed, the third clutch and the first brake are operated at a second forward speed, the third and fourth clutches are operated at a third forward speed, the first and third clutches are operated at a fourth forward speed, the second and third clutches are operated at a fifth forward speed, the first and second clutches are operated at a sixth forward speed, the second and fourth clutches are operated at a seventh forward speed, the second clutch and the first brake are operated at an eighth forward speed, and the fourth clutch and the second brake are operated at a reverse speed.

In another aspect of the present invention, the first planetary gear set may be a double pinion planetary gear set having a first sun gear, a first planet carrier, and a first ring gear as operating members thereof, wherein the first sun gear is operated as the first operating member, the first ring gear is operated as the second operating member, and the first planet carrier is operated as the third operating member.

The second planetary gear set may be a single pinion planetary gear set having a second sun gear, a second planet carrier, and a second ring gear as operating members thereof, wherein the second sun gear is operated as the fourth operating member, the second planet carrier is operated as the fifth operating member, and the second ring gear is operated as the sixth operating member.

The third planetary gear set may be a double pinion planetary gear set having a third sun gear, a third planet carrier, and a third ring gear as operating members thereof, wherein the third sun gear is operated as the seventh operating member, the third ring gear is operated as the eighth operating member, and the third planet carrier is operated as the ninth operating member.

In further another aspect of the present invention, the power train of an automatic transmission, may include a double pinion planetary gear set having a first sun gear, a first planet carrier, and a first ring gear as operating members thereof, wherein the first sun gear is operated as a first operating member, the first ring gear is operated as a second operating member, and the first planet carrier is operated as a third operating member, the first operating member being connected to a transmission case, and the third operating member being connected to an input shaft, wherein the second operating member outputs a reduced rotation speed, a single pinion planetary gear set having a second sun gear, a second planet carrier, and a second ring gear as operating members thereof, wherein the second sun gear is operated as a fourth operating member, the second planet carrier is operated as a fifth operating member, and the second ring gear is operated as a sixth operating member, wherein the fourth operating member is connected to the second operating member and the fifth operating member is selectively connected to the input shaft, a double pinion planetary gear set having a third sun gear, a third planet carrier, and a third ring gear as operating members thereof, wherein the third sun gear is operated as a seventh operating member, the third ring gear is operated as an eighth operating member, and the third planet carrier is operated as a ninth operating member, the seventh operating member being selectively connected to the third or fourth operating members and selectively connected to the transmission case, the eighth operating member being connected to the sixth operating member and selectively connected to the transmission case, and the ninth operating member being selectively connected to the fifth operating member and connected to the output shaft, a first clutch selectively connecting the third operating member to the seventh operating member, a second clutch selectively connecting the fifth operating member to the input shaft, a third clutch selectively connecting the fifth operating member to the ninth operating member, a fourth clutch selectively connecting the fourth operating member to the seventh operating member, a first brake selectively connecting the seventh operating member to the transmission case, and a second brake selectively connecting the eighth operating member to the transmission case.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart for an exemplary power train according to the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
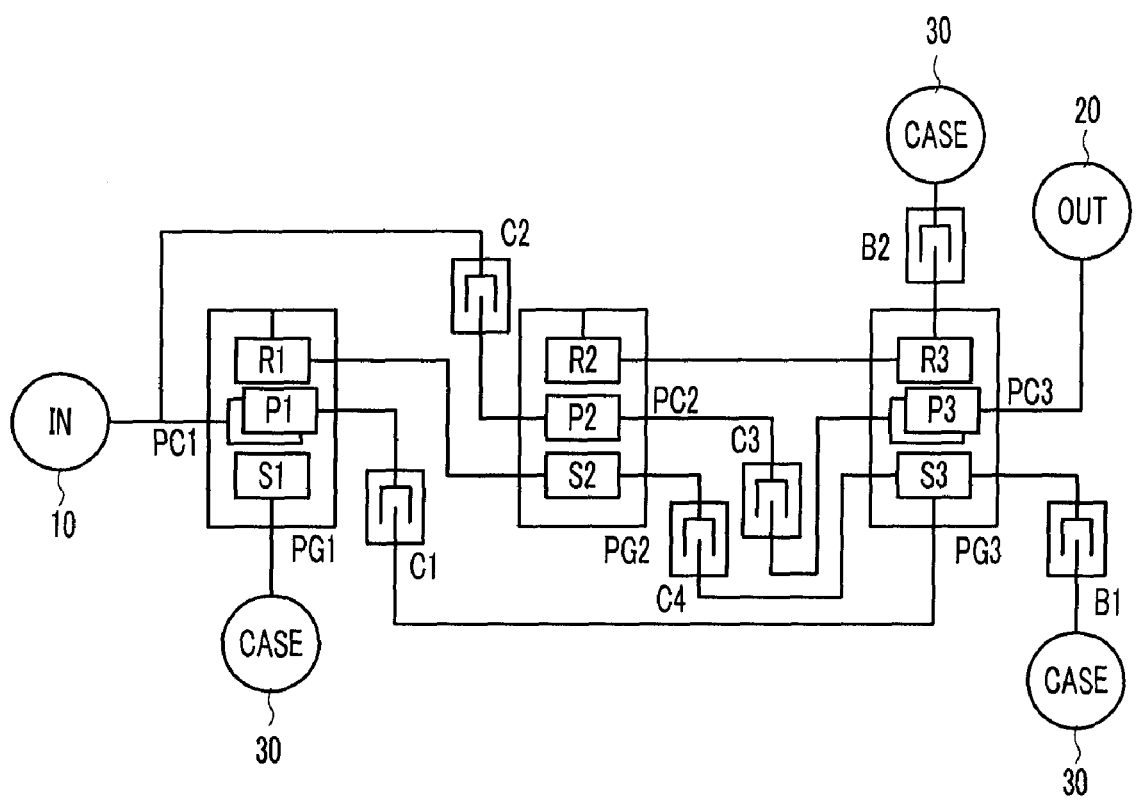
FIG. 1 is a schematic diagram of an exemplary power train of an automatic transmission according to the present invention.

As shown in FIG. 1, a power train of an automatic transmission according to various embodiments of the present invention includes an input shaft 10, an output shaft 20, a transmission case 30, and first, second, and third planetary gear sets PG1, PG2, and PG3.

The input shaft 10 receives torque of an engine through a torque converter.

The output shaft 20 outputs the torque from the power train.

The first planetary gear set PG1 is a double pinion planetary gear set having a first sun gear S1, a first planet carrier PC1, and a first ring gear R1 as operating members thereof. A first pinion gear P1, engaged with the first sun gear S1 and the first ring gear R1, is rotatably connected to the first planet carrier PC1.

The second planetary gear set PG2 is a single pinion planetary gear set having a second sun gear S2, a second planet carrier PC2, and a second ring gear R2 as operating members thereof. A second pinion gear P2, engaged with the second sun gear S2 and the second ring gear R2, is rotatably connected to the second planet carrier PC2.

The third planetary gear set PG3 is a double pinion planetary gear set having a third sun gear S3, a third planet carrier PC3, and a third ring gear R3 as operating members thereof. A third pinion gear P3, engaged with the third sun gear S3 and the third ring gear R3, is rotatably connected to the third planet carrier PC3.

The first sun gear S1 is fixedly connected to the transmission case 30, and the first planet carrier PC1 is fixedly connected to the input shaft 10 and is selectively connected to the third sun gear S3.

The first ring gear R1 is fixedly connected to the second sun gear S2, and the second sun gear S2 is selectively connected to the third sun gear S3.

The second planet carrier PC2 is selectively connected to the input shaft 10 and selectively to the third planet carrier PC3.

The second ring gear R2 is fixedly connected to the third ring gear R3, and the third sun gear S3 is selectively connected to the transmission case 30.

The third ring gear R3 is selectively connected to the transmission case, and the third planet carrier PC3 is fixedly connected to the output shaft 20 so as to be always operated as an output member.

In addition, the power train includes a plurality of friction members C1, C2, C3, C4, B1, and B2 that selectively connect respective operating members of the planetary gear sets PG1, PG2, and PG3 to the input shaft 10, the transmission case 30, or other operating members.

A first clutch C1 selectively connects the first planet carrier PC1 to the third sun gear S3; a second clutch C2 selectively connects the second planet carrier PC2 to the input shaft 10; a third clutch C3 selectively connects the second planet carrier PC2 to the third planet carrier PC3; and a fourth clutch C4 selectively connects the second sun gear S2 to the third sun gear S3.

In addition, a first brake B1 selectively connects the third sun gear S3 to the transmission case 30, and a second brake B2 selectively connects the third ring gear R3 to the transmission case 30.

As shown in FIG. 2, the automatic transmission according to various embodiments of the present invention realizes eight forward speeds and one reverse speed, and two friction members are operated respectively at each shift speed.

That is, the third clutch C3 and the second brake B2 are operated at a first forward speed D1; the third clutch C3 and the first brake B1 are operated at a second forward speed D2; the third and fourth clutches C3 and C4 are operated at a third forward speed D3; and the first and third clutches C1 and C3 are operated at a fourth forward speed D4.

In addition, the second and third clutches C2 and C3 are operated at a fifth forward speed D5; the first and second clutches C1 and C2 are operated at a sixth forward speed D6;

the second and fourth clutches C2 and C4 are operated at a seventh forward speed D7; and the second clutch C2 and the first brake B1 are operated at an eighth forward speed D8.

Further, the fourth clutch C4 and the second brake B2 are operated at a reverse speed REV.

Hereinafter, formation of the eight forward speeds and one reverse speed in the power train of an automatic transmission according to various embodiments of the present invention will be described in detail.

Figure 3:
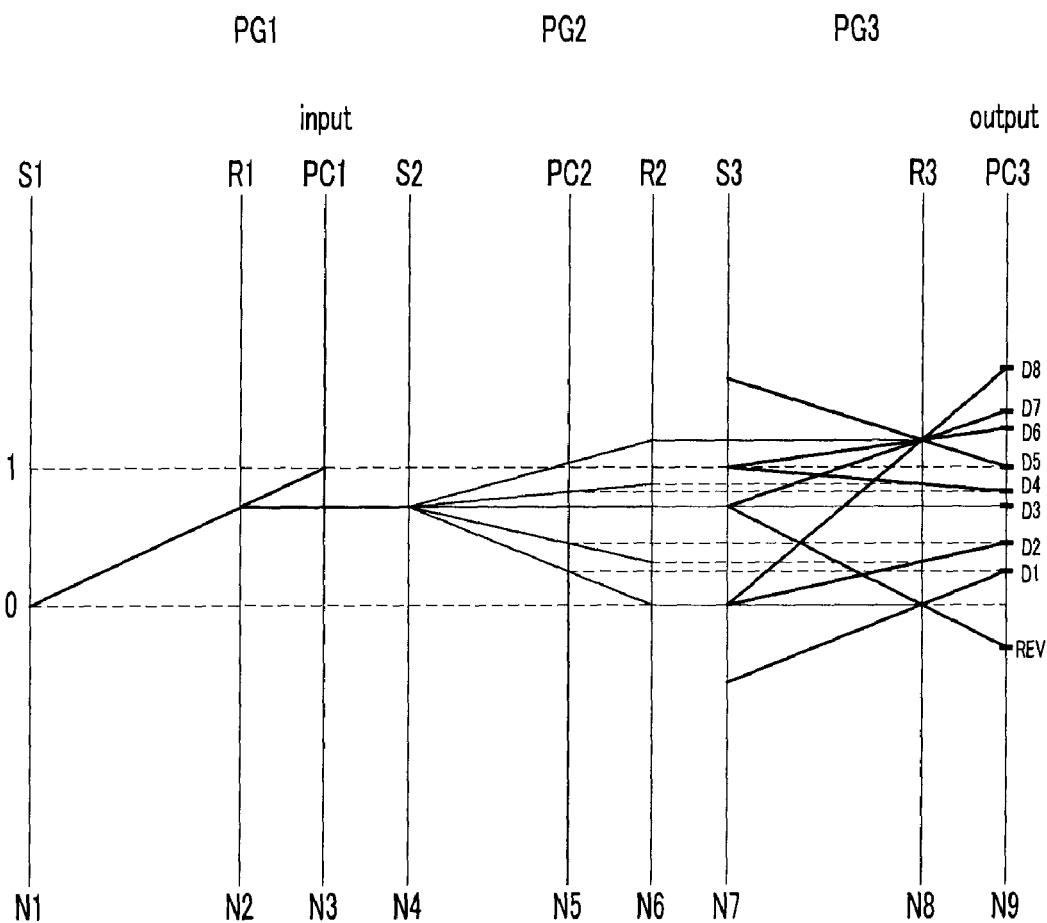
FIG. 3 is a lever diagram showing shifting processes from a first forward speed to a eighth forward speed and one reverse speed in an exemplary power train according to the present invention.

As shown in FIG. 3, the first sun gear S1 is set as a first operating member N1; the first ring gear R1 is set as a second operating member N2; the first planet carrier PC1 is set as a third operating member N3; the second sun gear S2 is set as a fourth operating member N4; the second planet carrier PC2 is set as a fifth operating member N5; the second ring gear R2 is set as a sixth operating member N6; the third sun gear S3 is set as a seventh operating member N7; the third ring gear R3 is set as an eighth operating member N8; and the third planet carrier PC3 is set as a ninth operating member N9.

First Forward Speed

At the first forward speed D1, the third clutch C3 and the second brake B2 are operated.

Since a rotation speed of the input shaft 10 is transmitted to the third operating member N3 and the first operating member N1 is stopped, the second operating member N2 outputs a reduced rotation speed. The reduced rotation speed is transmitted to the fourth operating member N4 fixedly connected to the second operating member N2.

In this case, the eighth operating member N8 and the sixth operating member N6 fixedly connected thereto are stopped by operation of the second brake B2. Therefore, a rotation speed of the fifth operating member N5 is transmitted to the ninth operating member N9 by operation of the third clutch C3, and the first forward speed D1 is output through the ninth operating member N9 that is the output member.

Second Forward Speed

If a vehicle speed increases in a state of the first forward speed D1, a transmission control unit releases the second brake B2 and engages the first brake B1.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

In this case, the fifth operating member N5 and the ninth operating member N9 are connected to each other by the operation of the third clutch C3, and the seventh operating member N7 is stopped by operation of the first brake B1. Therefore, the second forward speed D2 is output through the ninth operating member N9 that is the output member by means of the reduced rotation speed transmitted to the fourth operating member N4 and the stop of the seventh operating member.

Third Forward Speed

If the vehicle speed increases in a state of the second forward speed D2, the transmission control unit releases the first brake B1 and engages the fourth clutch C4.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

The fifth operating member N5 and the ninth operating member N9 are connected to each other by the operation of the third clutch C3, and the fourth operating member N4 and the seventh operating member N7 are connected to each other by operation of the fourth clutch C4.

Therefore, all operating members of the second and third planetary gear sets PG2 and PG3 rotate with the reduced rotation speed, and the third forward speed D3 is output through the ninth operating member N9 that is the output member.

Fourth Forward Speed

If the vehicle speed increases in a state of the third forward speed D3, the transmission control unit releases the fourth clutch C4 and engages the first clutch C1.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

In this case, the fifth operating member N5 and the ninth operating member N9 are connected to each other by the operation of the third clutch C3, and the third operating member N3 is connected to the seventh operating member N7 by operation of the first clutch C1.

Therefore, the fourth forward speed D4 is output through the ninth operating member N9 that is the output member by means of the reduced rotation speed of the fourth operating member N4 and the rotation speed of the input shaft 10 transmitted to the seventh operating member N7.

Fifth Forward Speed

If the vehicle speed increases in a state of the fourth forward speed D4, the transmission control unit releases the first clutch C1 and engages the second clutch C2.

In this case, the rotation speed of the input shaft 10 is transmitted to the fifth operating member N5 by operation of the second clutch C2 and is then transmitted to the ninth operating member N9 by the operation of the third clutch C3.

Therefore, the fifth forward speed D5 is output through the ninth operating member N9 that is the output member.

Sixth Forward Speed

If the vehicle speed increases in a state of the fifth forward speed D5, the transmission control unit releases the third clutch C3 and engages the first clutch C1.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

In this case, the rotation speed of the input shaft 10 is transmitted to the fifth operating member N5 by the operation of the second clutch C2, and accordingly an increased rotation speed is generated at the sixth operating member N6. The increased rotation speed of the sixth operating member N6 is transmitted to the eighth operating member N8.

In addition, the rotation speed of the input shaft 10 is transmitted to the seventh operating member N7 through the third operating member N3 by the operation of the first clutch C1.

Therefore, the sixth forward speed D6 is output through the ninth operating member N9 that is the output member.

Seventh Forward Speed

If the vehicle speed increases in a state of the sixth forward speed D6, the transmission control unit releases the first clutch C1 and engages the fourth clutch C4.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

In this case, the rotation speed of the input shaft 10 is transmitted to the fifth operating member N5 by the operation of the second clutch C2, and accordingly the increased rotation speed is generated at the sixth operating member N6. The increased rotation speed of the sixth operating member N6 is transmitted to the eighth operating member N8.

In addition, the reduced rotation speed of the fourth operating member N4 is transmitted to the seventh operating member N7 by the operation of the fourth clutch C4.

Therefore, the seventh forward speed D7 is output through the ninth operating member N9 that is the output member.

Eighth Forward Speed

If the vehicle speed increases in a state of the seventh forward speed D7, the transmission control unit releases the fourth clutch C4 and engages the first brake B1.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

In this case, the rotation speed of the input shaft 10 is transmitted to the fifth operating member N5 by the operation of the second clutch C2, and accordingly the increased rotation speed is generated at the sixth operating member N6. The increased rotation speed of the sixth operating member N6 is transmitted to the eighth operating member N8.

In addition, the seventh operating member N7 is stopped by the operation of the first brake B1, and accordingly the eighth forward speed D8 is output through the ninth operating member N9 that is the output member.

Reverse Speed

At the reverse speed REV, the fourth clutch C4 and the second brake B2 are operated.

Since the rotation speed of the input shaft 10 is transmitted to the third operating member N3 and the first operating member N1 is stopped, the second operating member N2 outputs the reduced rotation speed. The reduced rotation speed is transmitted to the fourth operating member N4 fixedly connected to the second operating member N2.

In this case, the reduced rotation speed of the fourth operating member N4 is transmitted to the seventh operating member N7 by the operation of the fourth clutch C4, and the eighth operating member N8 is stopped by the operation of the second brake B2.

Therefore, the reverse speed REV is output through the ninth operating member N9 that is the output member.

As described above, a power train of an automatic transmission according to various embodiments of the present invention can realize eight forward speeds and one reverse speed by using two double pinion planetary gear sets, one single pinion planetary gear set, four clutches, and two brakes.

In addition, since many shift speeds are realized, power delivery performance may be improved and fuel consumption may be reduced by effectively using engine torque.

Furthermore, since the third clutch is always engaged from the first forward speed to the fifth forward speed and the second clutch is always engaged from the fifth forward speed to the eighth forward speed, control of the clutches may be simplified.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof It is intended that the scope of the invention be defined by the Claims appended hereto and their equivalents.

What is claimed is:

1. A power train of an automatic transmission, comprising:
   a first planetary gear set including a first operating member connected to a transmission case, a second operating member, and a third operating member connected to an input shaft, wherein the second operating member outputs a reduced rotation speed;
   a second planetary gear set including a fourth operating member connected to the second operating member, a fifth operating member selectively connected to the input shaft, and a sixth operating member;
   a third planetary gear set including a seventh operating member selectively connected to the third or fourth operating members and selectively connected to the transmission case, an eighth operating member connected to the sixth operating member and selectively connected to the transmission case, and a ninth operating member selectively connected to the fifth operating member and connected to an output shaft; and
   a plurality of friction members selectively connecting the operating members of the first, second, and third planetary gear sets to the input shaft, other operating members, or the transmission case.

2. The power train of claim 1, wherein the plurality of friction members comprises:
   a first clutch selectively connecting the third operating member to the seventh operating member;
   a second clutch selectively connecting the fifth operating member to the input shaft;
   a third clutch selectively connecting the fifth operating member to the ninth operating member;
   a fourth clutch selectively connecting the fourth operating member to the seventh operating member;
   a first brake selectively connecting the seventh operating member to the transmission case; and
   a second brake selectively connecting the eighth operating member to the transmission case.

3. The power train of claim 2, wherein the third clutch and the second brake are operated at a first forward speed,
   the third clutch and the first brake are operated at a second forward speed,
   the third and fourth clutches are operated at a third forward speed,
   the first and third clutches are operated at a fourth forward speed,
   the second and third clutches are operated at a fifth forward speed,
   the first and second clutches are operated at a sixth forward speed,
   the second and fourth clutches are operated at a seventh forward speed,
   the second clutch and the first brake are operated at an eighth forward speed, and
   the fourth clutch and the second brake are operated at a reverse speed.

4. The power train of claim 1, wherein the first planetary gear set is a double pinion planetary gear set having a first sun gear, a first planet carrier, and a first ring gear as operating members thereof, wherein the first sun gear is operated as the first operating member, the first ring gear is operated as the second operating member, and the first planet carrier is operated as the third operating member.

5. The power train of claim 1, wherein the second planetary gear set is a single pinion planetary gear set having a second sun gear, a second planet carrier, and a second ring gear as operating members thereof, wherein the second sun gear is operated as the fourth operating member, the second planet carrier is operated as the fifth operating member, and the second ring gear is operated as the sixth operating member.

6. The power train of claim 1, wherein the third planetary gear set is a double pinion planetary gear set having a third sun gear, a third planet carrier, and a third ring gear as operating members thereof, wherein the third sun gear is operated as the seventh operating member, the third ring gear is operated as the eighth operating member, and the third planet carrier is operated as the ninth operating member.

7. A power train of an automatic transmission, comprising:

a double pinion planetary gear set having a first sun gear, a first planet carrier, and a first ring gear as operating members thereof, wherein the first sun gear is operated as a first operating member, the first ring gear is operated as a second operating member, and the first planet carrier is operated as a third operating member, the first operating member being connected to a transmission case, and the third operating member being connected to an input shaft, wherein the second operating member outputs a reduced rotation speed;

a single pinion planetary gear set having a second sun gear, a second planet carrier, and a second ring gear as operating members thereof, wherein the second sun gear is operated as a fourth operating member, the second planet carrier is operated as a fifth operating member, and the second ring gear is operated as a sixth operating member, wherein the fourth operating member is connected to the second operating member and the fifth operating member is selectively connected to the input shaft;

a double pinion planetary gear set having a third sun gear, a third planet carrier, and a third ring gear as operating members thereof, wherein the third sun gear is operated as a seventh operating member, the third ring gear is operated as an eighth operating member, and the third planet carrier is operated as a ninth operating member, the seventh operating member being selectively connected to the third or fourth operating members and selectively connected to the transmission case, the eighth operating member being connected to the sixth operating member and selectively connected to the transmission case, and the ninth operating member being selectively connected to the fifth operating member and connected to the output shaft;

a first clutch selectively connecting the third operating member to the seventh operating member;

a second clutch selectively connecting the fifth operating member to the input shaft;

a third clutch selectively connecting the fifth operating member to the ninth operating member;

a fourth clutch selectively connecting the fourth operating member to the seventh operating member;

a first brake selectively connecting the seventh operating member to the transmission case; and a second brake selectively connecting the eighth operating member to the transmission case.

8. The power train of claim 7, wherein the third clutch and the second brake are operated at a first forward speed, the third clutch and the first brake are operated at a second forward speed, the third and fourth clutches are operated at a third forward speed, the first and third clutches are operated at a fourth forward speed, the second and third clutches are operated at a fifth forward speed, the first and second clutches are operated at a sixth forward speed, the second and fourth clutches are operated at a seventh forward speed, the second clutch and the first brake are operated at an eighth forward speed, and the fourth clutch and the second brake are operated at a reverse speed.

* * * * *